United States Patent
Wu et al.

(10) Patent No.: US 6,676,918 B2
(45) Date of Patent: Jan. 13, 2004

(54) HYDROGEN SULFIDE REMOVAL FROM LIQUID SULFUR

(75) Inventors: Francis Sui Lun Wu, The Woodlands, TX (US); Michael Allen Capone, Williamstown, NJ (US); Raymond Paul Shapka, Okotoks (CA); David Ian Devenny, Calgary (CA)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 10/393,782

(22) Filed: Mar. 21, 2003

(65) Prior Publication Data

US 2003/0232003 A1 Dec. 18, 2003

Related U.S. Application Data

(60) Provisional application No. 60/388,992, filed on Jun. 14, 2002.

(51) Int. Cl.$^7$ ............................................... C01B 17/02
(52) U.S. Cl. ..................... 423/578.1; 423/563; 423/564
(58) Field of Search ................................ 423/563, 564, 423/578.1

(56) References Cited

U.S. PATENT DOCUMENTS

RE32,009 E * 10/1985 Ledford et al. ......... 423/578 R
5,080,695 A * 1/1992 Kassarjian ..................... 55/53

OTHER PUBLICATIONS

Lagas "Stop emissions from liquid sulfur" *Hydrocarbon Processing* pp. 85–89, Oct. 1982.*

* cited by examiner

*Primary Examiner*—Stanley S. Silverman
*Assistant Examiner*—Timothy C. Vanoy
(74) *Attorney, Agent, or Firm*—Paul E Purwin; Malcolm D. Keen

(57) ABSTRACT

A method for removing hydrogen sulfide from liquid sulfur, comprising introducing liquid sulfur containing hydrogen sulfide in an upstream portion of a conduit. The conduit has a fluid outlet in a downstream portion thereof located within a lower portion of a first vessel. The method further includes causing the liquid sulfur to flow through the conduit outlet into the first vessel, up an annulus formed between the conduit and the first vessel and overflow through an outlet positioned at an upper portion of the first vessel into a second vessel which is connected to a liquid sulfur pit operating at atmospheric pressure. Air is introduced into the liquid sulfur located in the annulus at a point between the conduit outlet and said first vessel outlet. The flows concurrently to the direction of flow of the liquid sulfur in the annulus and out of the first vessel outlet into the second vessel thereby removing hydrogen sulfide from the liquid sulfur in the annulus.

7 Claims, 2 Drawing Sheets

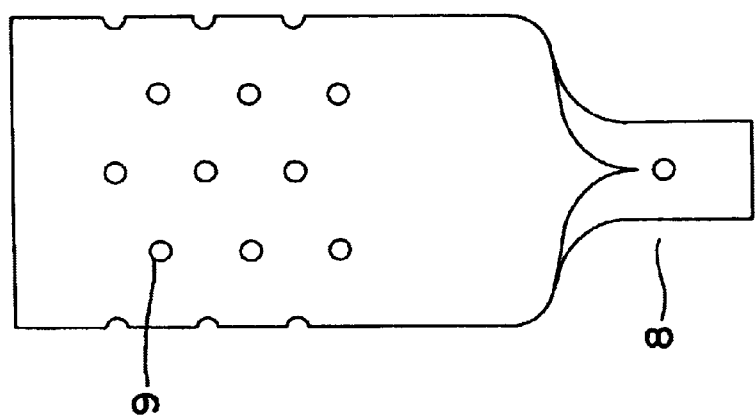
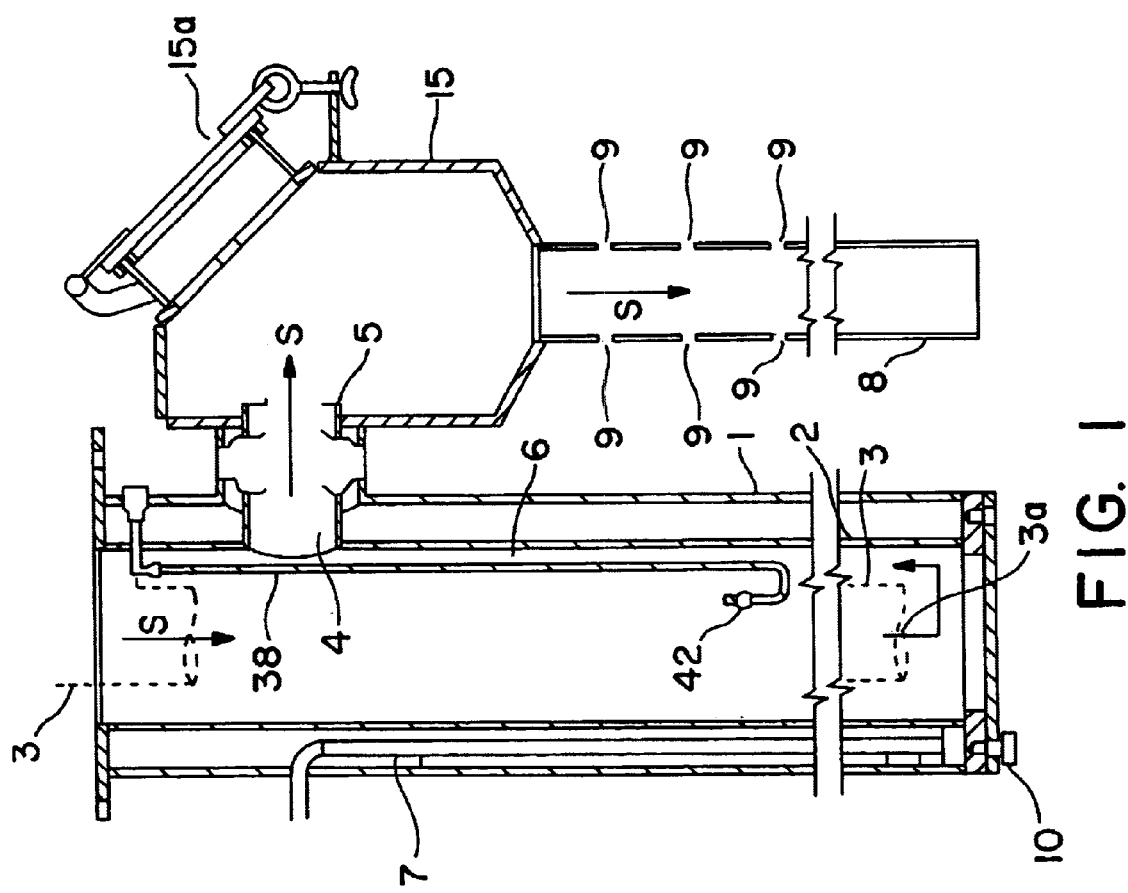

HYDROGEN SULFIDE REMOVAL FROM LIQUID SULFUR

This application claims the benefit of U.S. Provisional Application(s) No(s).: 60/388,992 filed on Jun. 14, 2002.

FIELD OF THE INVENTION

The present invention relates to methods and devices for removing hydrogen sulfide from liquid sulfur such as the one produced by a Claus process.

BACKGROUND OF THE INVENTION

The Claus process is a well known process for producing elemental sulfur by reacting hydrogen sulfide and sulfur dioxide. Typically, hydrogen sulfide in refinery product gases is partially combusted to produce sulfur dioxide, which then reacts with the unburned hydrogen sulfide to yield sulfur and water. The sulfide is condensed and recovered. Suitable catalysts may also be used to promote the sulfur production.

The basic chemistry of the Claus process is as follows:

$$H_2S + \tfrac{3}{2}O_2 \rightarrow SO_2 + H_2O$$

$$2H_2S + SO_2 \rightarrow \tfrac{3}{8}S_8 + 2H_2O$$

Hydrogen sulfide is soluble in liquid sulfur. The dissolved hydrogen sulfide may react with the sulfur diradical chain species to form hydrogen polysulfides, as follows:

$$H_2S + \cdot S_{x-1} \cdot \rightarrow H_2S_x$$

The conversion rate of hydrogen polysulfide back to hydrogen sulfide is generally very low.

One problem associated with the Claus process is the presence in the produced liquid sulfur of dissolved hydrogen sulfide. The hydrogen sulfide contaminates the products and may pose serious hazards. For example, hydrogen sulfide may create nuisance odors in the vicinity of liquid sulfur, and may also reach toxic levels when loading and unloading the sulfur. Also, when storing liquid sulfur in tanks or other vessels, a threat exists that the lower explosive limit of hydrogen sulfide may be reached.

Typically, sulfur produced from a Claus sulfur plant may contain from about 150 to about 450 wppm (weight parts per million) of hydrogen sulfide which may evolve with time in the storage facilities such as pits, tanks, tank trucks, and/or tank cars and accumulate in the vapor phase creating unsafe conditions. For instance, hydrogen sulfide can escape out of the storage device resulting in a release to the atmosphere. Hydrogen sulfide in the vapor phase of a storage device may build up to a level exceeding its lower explosive limit and cause an explosion. Sulfur storage explosions have occurred in the industry.

To eliminate these and other problems, a number of methods have been suggested or developed that remove hydrogen sulfide from liquid sulfur. Release of dissolved hydrogen sulfide has been carried out by agitating the liquid sulfur by various means, such as by mechanical agitating means, spraying means, by bubbling air through the liquid sulfur, and by circulating the sulfur over a stripping column. The released hydrogen sulfide is often removed from the pit gas space by a sweep gas, which typically may be any suitable inert gas such as air, Claus tail gas or nitrogen.

For example, U.S. Pat. No. 5,080,695 ('695) issued on Jan. 14, 1992 to Kassarjian, describes a method of removing hydrogen sulfide from liquid sulfur wherein the liquid sulfur is caused to flow continuously through a seal pot where it is contacted by a counter-flowing inert gas, thereby stripping hydrogen sulfide from the sulfur. The inert gas which is typically, nitrogen flows back to the Claus process. One problem with the method of the '695 patent is that selection of degassing agent is restricted to inert gases which have been demonstrated to be less effective degassing agents than oxygen containing gas streams, such as air. Since the spent gas is returned to the process in the '695 patent, an oxygen containing gas, such as air, could not be used because of safety concerns.

Presently, most industrial facilities remove hydrogen sulfide from the liquid sulfur by injecting a gas, such as air, nitrogen and steam in the pit where liquid sulfur is stored. Some have installed elaborately designed nozzles inside the pit for dispersing the gas into the pit.

However, installation or replacement of air sparging or mixing equipment in a storage device such as a pit requires emptying out the entire is sulfur inventory. This typically requires shutting down the entire sulfur unit for several days because of the highly corrosive, and pyrophoric environment in the pit. The pit should be depleted of any sulfur and made safe before human personnel may enter and make the installation. Other problems exist with known methods for reducing the amount of hydrogen sulfide in liquid sulfur.

SUMMARY OF THE INVENTION

The present invention offers an improved, cost-effective method and apparatus to remove a substantial quantity of hydrogen sulfide from liquid sulfur. The method is particularly suitable for removing hydrogen sulfide from liquid sulfur produced from a Claus process.

One aspect of the present invention relates to an improved method for removing hydrogen sulfide from liquid sulfur. The method comprises introducing liquid sulfur containing hydrogen sulfide in an upstream portion of a conduit. The conduit has a fluid outlet in a downstream portion thereof which is located within a lower portion of a first vessel. The liquid sulfur is caused to flow through the fluid outlet of the conduit into the first vessel and then up an annulus space that is formed between the exterior of the conduit and the interior of the first vessel. The liquid sulfur overflows through a first vessel outlet positioned at an upper portion of the first vessel into a second vessel. The second vessel is connected to a liquid sulfur storage device such as a pit that operates typically at atmospheric pressure. The method further includes introducing air or enriched oxygen air into the liquid sulfur located in the annulus formed between the exterior of the conduit and the interior surface of the first vessel at a point that lies between the conduit outlet and the first vessel outlet. The air is caused to flow concurrently to the direction of flow of the liquid sulfur in the annulus and out of the first vessel outlet into the second vessel thereby removing hydrogen sulfide from the liquid sulfur in said annulus space.

One advantage of the present inventive method is that air and/or enriched oxygen air can be used instead of the more expensive and less effective inert gases that are typically used because of safety concerns. Air and/or enriched oxygen air can be used because it is not allowed to go upstream to the Claus process. More specifically according to the present inventive method, the air travels concurrently with the upward flow of liquid sulfur in the annulus space formed between the conduit and the first vessel. Thus, the air is transferred to a sulfur storage vessel or pit that is typically open to the atmosphere instead of going upstream to the Claus process.

Another advantage of the present inventive method is that it does not require taking out of service a sulfur storage device to install or to maintain the equipment necessary to practice the method, since air is injected into a separate vessel such as a seal pot of a Claus process.

Yet another advantage of the present invention is that the method can be used with a catalyst to promote degassing. These and other advantages of the present invention will become more apparent to persons skilled in this art from the following detailed description of the invention in conjunction with the following figures.

BRIEF DESCRIPTION OF THE DRAWINGS

FIG. 1 is a side longitudinal sectional view of a preferred apparatus for practicing the present invention method.

FIG. 2 is an enlarged side view of pipe 8 of FIG. 1, showing a plurality of perforations 9 used for equilibrating pressure between pipe 8 and the sulfur pit 320 (shown in FIG. 3).

DETAILED DESCRIPTION OF THE INVENTION

Figure 3:
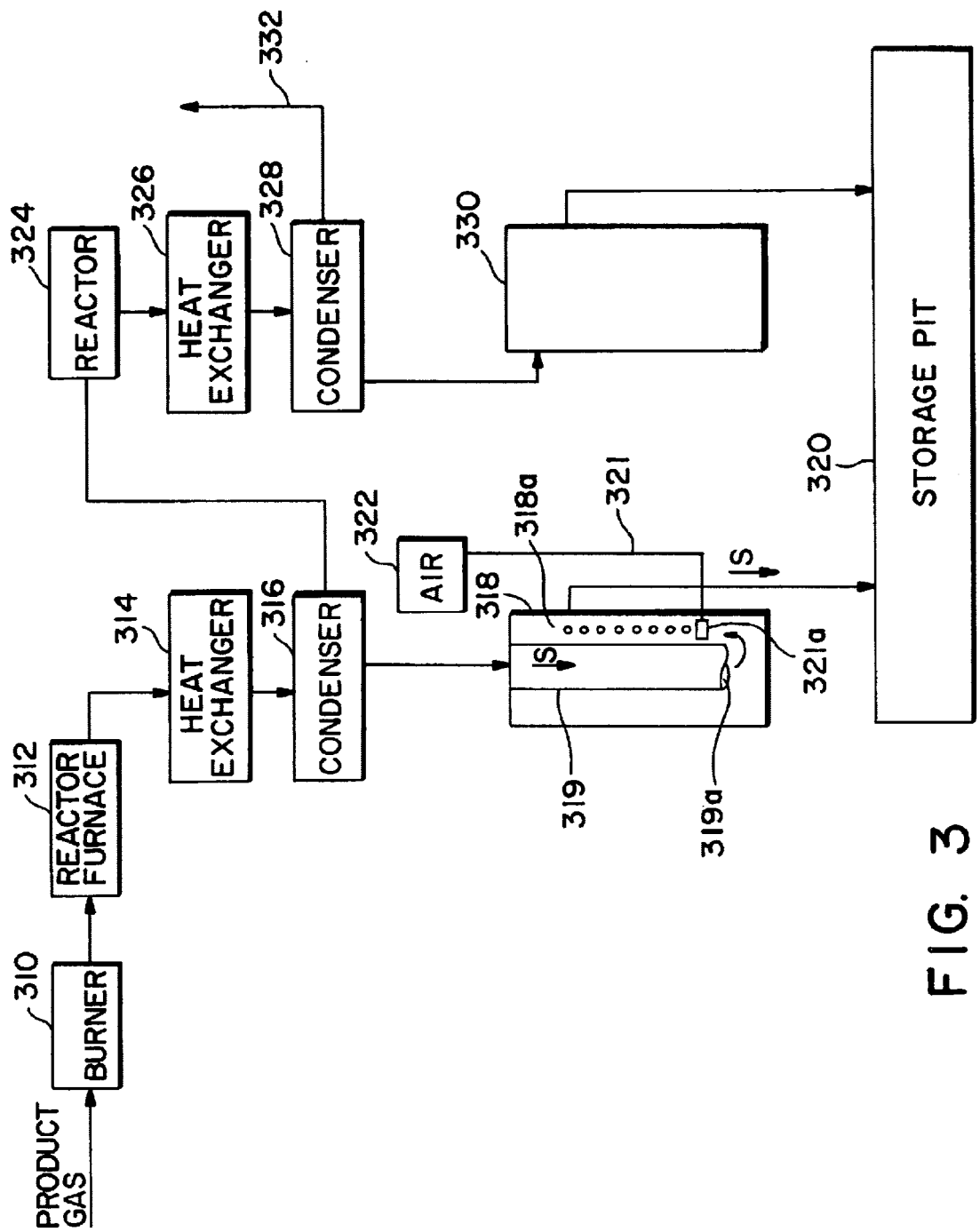
FIG. 3 is a simplified schematic of the present inventive method.

Referring now to FIG. 1, vessel 2, also referred to as the seal pot, is an elongated vessel having an inlet through which conduit 3 is centrally positioned inside the seal pot 2. The conduit 3 terminates at an outlet 3a near the bottom of the seal pot 2. Positioned in the upper portion of the seal pot 2, there is an outlet 4 for fluid communication with a storage device such as the pit 320 (shown in FIG. 3). The seal pot 2 communicates with the storage pit 320 through pipe 5, second vessel 15 and pipe 8. In operation, liquid sulfurs product from a Claus unit (shown in FIG. 3) flows by gravity through conduit 3 into a lower portion of vessel 2 and then up through the annulus space 6 formed between the exterior surface of conduit 3 and the interior surface of the seal pot 2. The liquid sulfur then overflows via outlet 4 and pipe 5 into the second vessel 15. Vessel 15 is connected to a liquid sulfur storage device such as sulfur pit 320 (shown in FIG. 3) which operates at atmospheric pressure. Vessel 15 is often referred to as a "look box". Operations personnel may open the lid 15a and, by looking into vessel 15, visually can confirm sulfur flow through the associated seal.

The seal pot is steam jacketed to maintain sulfur in the liquid phase. Steam is introduced via pipe 7 into an annular space formed between the exterior of the sulfur seal pot 2 and vessel wall 1. Drainage ports are provided for maintenance purposes, but are plugged with plug 10 during normal operation.

A sulfur plant operates typically at a pressure of about 10 to 20 psig. The hydrostatic head produced from the sulfur liquid level difference between the liquid inside the conduit 3 and the liquid in the annulus space 6 between conduit 3 and seal pot 2 prevents acid gas vapors from blowing out of the seal pot 2 hence, the term, sulfur seal. The seal pot 2 maintains the operating pressure of the sulfur plant. Sulfur seal pots are provided for each of the condensers where sulfur is produced, as well as for any low points of a Claus unit. Air under sufficient pressure is introduced into the sulfur seal, i.e., the liquid sulfur in the annulus space 6 formed between conduit 3 and vessel 2 using an air line 38 having a small opening nozzle 42. Air enters the liquid sulfur inventory via nozzle 42. Air then travels concurrently with the upward flowing liquid sulfur and enters vessel 15 together with the liquid sulfur. While liquid sulfur flows into the pit 320 via the downpipe, 8, air escapes into the pit via the holes 9 of the downpipe 8.

The air and the liquid sulfur are maintained in contact due to the relatively small annular space 6 between the conduit 3 and the seal pot 2. For example, the annular space 6 may preferably be from about 0.25 to about 12.0 inches wide, and more preferably from about 0.5 to about 2.0 inches wide. The air line 38 may be from about 0.125 to about 1.0 inches in diameter. The amount of air used per pound of liquid sulfur treated may vary based on the amount of hydrogen sulfide to be removed, the width of the annulus space 6 and the mass velocity of the liquid sulfur in the annulus space 6, however, typically from about 0.10 to about 0.40 standard cubic feet (scf) of air may be used per pound of liquid sulfur treated, preferably from about 0.03 to about 0.60 and more preferably from about 0.10 to about 0.40, depending upon the feed sulfur characteristics. Sufficient excess air must be added to prevent an explosive mixture of $H_2S$ in air from forming, while maintaining the pit vacuum at an acceptable level to prevent the release of toxic vapours to the atmosphere.

As a result of the contact of air and liquid sulfur in the annular space 6 hydrogen sulfide is stripped from the sulfur. Also, because of the use of air some hydrogen sulfide is removed by reacting with the oxygen in the air to form is sulfur dioxide and liquid sulfur.

In yet another preferred embodiment of the invention a catalyst may be introduced simultaneously with the air into the annulus space 6 between the conduit 2 and seal pot 3.

Suitable catalysts facilitate the conversion of hydrogen polysulfides to hydrogen sulfide which then may be removed via the air. Hydrogen sulfide is known to combine with the sulfur to form hydrogen polysulfides according to the following reaction:

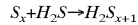

$$S_x + H_2S \rightarrow H_2S_{x+1}$$

The formation of the polysulfides is favored at the high temperatures associated with the Claus plant. This is particularly true during the initial oxidation step in the furnace and boiler where the major portion of the sulfur is also produced. Unfortunately, the kinetics of the reverse reaction at lower temperatures characteristic of hydrogen sulfide removal are extremely slow. Thus, the polysulfides are inherently produced in the Claus process, and once formed are extremely slow in decomposing. Consequently, the apparent solubility of hydrogen sulfide in liquid sulfur is unexpectedly high due to the formation of polysulfides, and the subsequent release or removal of hydrogen sulfide is slow and difficult, frequently involving significant quantities of hydrogen sulfide being released days and even weeks after formation.

Examples of suitable catalysts include any liquid or gaseous catalyst with demonstrated activity for decomposing $H_2S_x$. Most preferred catalysts include compounds with active nitrogen groups such as morpholine, quinoline, ammonia, and urea. U.S. Re Pat. No. 32,009 issued to Ledford et al describe a list of suitable catalysts which is incorporated herein by reference for all purposes and to the extent that it is not inconsistent with the present invention as described and claimed.

The level of liquid sulfur in the conduit 3 is lower than the level of liquid sulfur in the annulus between the conduit 3 and the walls of the seal pot 2. This difference is due to the difference in pressure between these two points, which corresponds to the amount of pressure in the process. In a typical example such a pressure differential may be in the area of 0.1 to 20 psig, which may correspond roughly to a difference in sulfur surface levels of about 0.1 to about 26 feet.

The operating conditions may change depending upon structural and process variations between installations. Generally, however, the portion of the annulus space which is common to the flow of both liquid sulfur and air should be sufficiently long to ensure an effective contact between the air and the liquid sulfur to adequately remove the hydrogen sulfide and polysulfides.

Many modifications of the above method can be readily envisioned by persons with ordinary skill in this art to make the method even more efficient without departing from the scope of the present invention. For example, the contact time that the sulfur and inert gas are in contact may be increased by further elongating the conduit 3, the seal pot 2, and the annulus space between the conduit 3 and the seal pot to increase the amount of hydrogen sulfide stripped from the sulfur. Another approach is to provide better means for distributing the air into the annulus including distributing the air into the annulus including the use of an injection nozzle or a ring around the annulus space with a plurality of perforations.

Although air is preferred, inert gases such as nitrogen may also be used. Also, oxygen enriched air may be used.

Introducing air into the sulfur seal annulus may lower the specific gravity of the liquid sulfur. Thus, depth of the seal pot may have to be increased in order to mitigate the effect of the sparging air on the sealing pressure.

Referring now to FIG. 3, a simplified schematic of an embodiment of the present invention method is illustrated. The method comprises a burner 310 into which feed acid gas is introduced. The combustion products of the product gas and oxygen evolve into the reaction furnace 312 where the endothermic reactions of the Claus process can take place. The effluent from the reactor furnace 312 passes through a heat exchanger 314 where it is cooled, and then to a condenser 316. Liquid sulfur is condensed out and is introduced into vessel 318, which preferably is a seal pot used to maintain pressure on the process. The liquid sulfur then passes into the sulfur storage pit 320. The method of the present invention involves the introduction of air and or enriched oxygen air to the vessel 318 through a line 321 from a header or other source 322.

The air or enriched oxygen air is introduced into an annulus space 318a formed between the exterior surface of a conduit 319 which is centrally positioned within the seal pot 318 and the interior surface of the seal pot 318 the air or enriched oxygen is introduced into the liquid sulfur inside the annulus space 318a via tubing 321 and distribution means 321a.

Still referring to FIG. 3, effluent from the condenser 316 is introduced to the catalytic converter reactor 324 where additional quantities of hydrogen sulfide and sulfur dioxide are reacted to produce additional sulfur, which is introduced into heat exchanger 326 and then to condenser 328. As in the case of the liquid sulfur exiting the condenser 316, the liquid sulfur from the condenser 328 is fed to seal pot 330, from which it passes to the storage pit 320.

The Claus process may include more than one reactors in series so that the effluent from the condenser 328 would be directed through line 332 to the next reactor. The effluent from the last condenser typically flows to a tail gas coalesce to separate liquid sulfur from the tail gases. The tail gases may also be treated to further increase the sulfur recovery of the process. For the purpose of illustrating the invention, therefore, air has been shown as being introduced only to the vessel 318. It could of course also be introduced to vessel 330 or any other downstream seal pots if it is desired to remove hydrogen sulfide from the liquid sulfur at those locations as well.

In a preferred embodiment of the invention catalyst may be introduced into the annulus space 318a to facilitate the conversion of polysulfides to hydrogen sulfide that can be then removed via the air. Preferably urea may be used in an amount of from about 10 wppm to about 500 wppm, and more preferably from about 100 wppm to about 200 wppm. Other catalysts can be used such as morpholine, urea, ammonia, quinoline, or other nitrogenous compounds.

The catalyst is preferably introduced into the conduit 3. It can also be injected at the bottom of the conduit 3 via a small tubing either placed inside the conduit 3, or in the annular space between the conduit 3 and the seal pot 2 paralleling the air line 38.

While specific embodiments have been described the invention is not limited to such embodiments and it covers any variations, uses, or adaptations that are within the scope of the invention as described in the appended claims.

What is claimed is:

1. A method for removing hydrogen sulfide from liquid sulfur, comprising:

introducing liquid sulfur containing hydrogen sulfide in an upstream portion of a conduit, the conduit having a fluid outlet in a downstream portion thereof located within a lower portion of a first vessel;

causing the liquid sulfur to flow through the conduit outlet into the first vessel up an annulus formed between the conduit and the first vessel and overflow through an outlet positioned at an upper portion of the first vessel into a second vessel which is connected to a liquid sulfur pit operating at atmospheric pressure;

introducing air into the liquid sulfur located in said annulus at a point between said conduit outlet and said first vessel outlet; and causing the air to flow concurrently to the direction of flow of the liquid sulfur in said annulus and out of said first vessel outlet into said second vessel thereby removing hydrogen sulfide from the liquid sulfur in said annulus.

2. The method of claim 1, wherein the conduit is substantially vertically aligned within said first vessel.

3. The method of claim 1, wherein the liquid sulfur containing hydrogen sulfide is produced by a Claus process.

4. The method of claim 1, wherein the air is introduced from a perforated tube positioned within the annulus between the conduit and the first vessel.

5. The method of claim 1, further comprising adding an effective catalyst for the conversion of hydrogen polysulfide to hydrogen sulfide, in an effective amount.

6. The method of claim 5, wherein the catalyst is a nitrogenous compound having active nitrogen groups.

7. The method of claim 5, wherein the catalyst is selected from the group consisting of urea, morpholine, ammonia, and quinoline.

* * * * *